United States Patent [19]

Bendix et al.

[11] Patent Number: 5,069,891
[45] Date of Patent: Dec. 3, 1991

[54] PROCESS FOR INDEPENDENT CONTROL OF METHANE AND RARE GAS CONTENTS OF AN AMMONIA-HYDROGEN RECOVERY-RARE GAS PLANT COMPLEX

[75] Inventors: Horst Bendix; Bernd Hochmuth, both of Wittenberg; Dieter Johannes, Eutzsch; Bodo Lakenmacher, Bestensee; Winfried Lausch, Wittenberg; Klaus Schuebel, Reinsdorf, all of German Democratic Rep.

[73] Assignees: VEB Agrochemie Piesteritz, Wittenberg-Piesteritz, Fed. Rep. of Germany; Toyo Engineering Corporation, Tokyo, Japan

[21] Appl. No.: 502,254

[22] Filed: Mar. 30, 1990

[30] Foreign Application Priority Data

Apr. 5, 1989 [DD] German Democratic Rep. .... 327273

[51] Int. Cl.$^5$ ................................................. C01C 1/04
[52] U.S. Cl. ...................................................... 423/359
[58] Field of Search .......................................... 423/359

[56] References Cited

U.S. PATENT DOCUMENTS

| 3,615,200 | 10/1971 | Konoki | 423/359 |
| 4,056,603 | 11/1977 | Bresler | 423/359 |
| 4,180,552 | 12/1979 | Graham et al. | 423/359 |
| 4,180,858 | 12/1979 | Gaines et al. | 423/359 |
| 4,298,588 | 11/1981 | Pinto | 423/359 |
| 4,910,007 | 3/1990 | Pinto et al. | 423/359 |
| 4,981,669 | 1/1991 | Pinto | 423/359 |

Primary Examiner—Wayne A. Langel
Attorney, Agent, or Firm—Flyn, Thiel, Boutell & Tanis

[57] ABSTRACT

Disclosed herein is a process for the separate control of the methane and rare gas contents of an ammonia-hydrogen recovery-rare gas plant complex. By the controlled withdrawal of a purge gas from the synthesis gas circulation, splitting of the purge gas into two partial streams and recycling of a partial stream to the synthesis gas generation section, the increase in inert gas to be taken out of the synthesis gas circulation as a result of the modernization of the ammonia plant can be prevented negative effect on the downstream hydrogen recovery/rare; thus energetic disadvantages or costly expansions or modifications of the ammonia-hydrogen recovery-rare gas plant complex are voided.

8 Claims, 1 Drawing Sheet

PROCESS FOR INDEPENDENT CONTROL OF METHANE AND RARE GAS CONTENTS OF AN AMMONIA-HYDROGEN RECOVERY-RARE GAS PLANT COMPLEX

BACKGROUND OF THE INVENTION (1) Field of the Invention

The invention relates to a process for the independent control of the methane and rare gas contents of an ammonia-hydrogen recovery-rare gas plant complex.

The process can be applied in all ammonia plants, the synthesis gas production section and/or synthesis loop of which has been upgraded and/or the ammonia production of which has been increased and the purge gas of which is separated into a hydrogen fraction and a residual gas fraction in a downstream hydrogen recovery unit, the residual gas fraction then being subjected to the recovery of rare gases and if necessary other components in an additional rare gas unit by low temperature separation. Here, it is also possible to combine the hydrogen recovery unit and the rare gas unit in one plant complex.

(2) Description of the Prior Art

A considerable portion of the presently produced ammonia is obtained on the basis of a synthesis gas formed by the steam reforming and partial oxidation of hydrocarbons. Here ammonia plants on natural gas basis, which produce the synthesis gas by steam reforming and which represent the development state of the sixties and seventies, prevail.

Ammonia production by the steam reforming of natural gas is commonly divided into the following process stages:

1. Compression of feed natural gas
2. Desulfurization of the natural gas
3. Conversion of the major portion of hydrocarbons in the natural gas into hydrogen, carbon monoxide and carbon dioxide by injection of steam in the primary reforming unit
4. Further conversion of methane into hydrogen, carbon monoxide and carbon dioxide by injection of process air in the secondary reforming unit
5. Conversion of carbon monoxide to carbon dioxide in a commonly two-stage carbon monoxide conversion unit
6. Removal of the formed carbon dioxide by chemical and/or physical scrubbing solutions in special absorption towers
7. Conversion of the remaining carbon monoxide and carbon dioxide in the synthesis gas to methane in the methanation unit
8. Multi-stage compression of the synthesis gas to the required synthesis pressure by the synthesis gas compressor
9. Partial conversion of the hydrogen and nitrogen in the synthesis recycle gas to ammonia
10. Separation of the ammonia product from the synthesis recycle gas
11. Splitting of a purge gas from the synthesis recycle gas for the removal of inert methane and rare gases
12. Recovery of hydrogen and rare gases from the purge gas
13. Recompression of the synthesis recycle gas The generation of the synthesis gas is usually carried out at a pressure of approx. 2.5 to 5 MPa. Depending on the pressure of the feed natural gas, it is therefore necessary to lower the pressure at the battery limit in case of a higher pressure or to increase it to the desired pressure of the synthesis gas generation unit, e.g. with a centrifugal compressor, in case of a lower pressure.

As the feed natural gas mostly contains small quantities of sulfur, which act as a catalyst poison in the downstream process stages, it is necessary to remove the sulfur in a desulfurization unit. For small sulfur contents, e.g. within the range of up to 100 mg/Nm$^3$, it is common to use zinc oxide for that purpose, which fixes hydrogen sulfide by forming zinc sulfide. However, as not all the sulfur is present as hydrogen sulfide, but is partly also bound as organic sulfur, e.g. in the form of mercaptanes, it must first be converted to hydrogen sulfide by conversion with hydrogen. The hydrogen required for that purpose is usually supplied by recycling a partial stream of the synthesis gas, which is known to contain approx. 75 vol % of hydrogen, from an intermediate pressure stage of the synthesis gas compressor. Depending on the sulfur content of the natural gas, the required hydrogen content is 5 to 10 vol %, i.e. the natural gas and the hydrogen-containing synthesis gas are mixed in a ratio of 14:1 to 6.5:1.

Actual conversion of the organic sulfur to hydrogen sulfide takes place at temperatures between 350° and 400° C. in the presence of a cobalt/molybdenum or nickel/molybdenum catalyst. After passing through a downstream reactor filled with zinc oxide, the total sulfur content of the process gas is commonly reduced to less than 0.5 mg/Nm$^3$.

The conversion of the hydrocarbons contained in the process gas down to a residual methane content of 10 to 12 vol % takes place after injection of excess process steam into a fuel-fired tubular furnace, the so-called primary reformer, at temperatures of approx. 800° C.

By adding process air to the following secondary reformer, with which the nitrogen component required for the synthesis of ammonia is introduced, the conversion of the not yet converted methane takes place at approx. 1,000° C. down to a residual content of approx. 0.5 vol %.

In the following common two-stage carbon monoxide conversion unit, the carbon monoxide contained in the process gas is converted, by steam, to hydrogen and carbon dioxide at temperatures of 200° to 450° C. down to a residual content of 0.2 to 0.5 vol %.

The removal of the carbon dioxide is carried out by scrubbing with chemically and/or physically functioning scrubbing solutions in special towers down to a residual content of approx. 0.1 vol %. As the residual quantities of carbon monoxide and carbon dioxide contained in the process gas are poisons for the catalyst used in ammonia synthesis, it is necessary to remove them down to a minimum content, usually below 10 mg/Nm$^3$. This is effected in most cases by conversion of these carbon oxides to methane by hydrogen in the methanation unit at temperatures of about 300° to 350° C.

After this process stage, the synthesis gas is available in the final form for the ammonia synthesis, i.e. it contains hydrogen and nitrogen at a ratio of 3:1, small quantities, usually 0.5 to 1.5 vol % of methane, which result, as already described, from the residual methane of the primary reforming and/or secondary reforming, the residual carbon monoxide of the carbon monoxide conversion and the residual carbon dioxide of the carbon dioxide removal, as well as rare gases, predominantly argon in the range of 0.3 to 0.7 vol %, which are introduced mainly by the process air supplied to the secondary reforming unit and partly also by the feed natural gas.

The synthesis gas is compressed in several stages to pressures of commonly 10 to 35 MPa and fed to the synthesis loop. There the partial conversion of hydrogen and nitrogen to ammonia takes place in the ammonia reactor. After separation of the ammonia product, the synthesis recycle gas is re-compressed and fed again to the ammonia reactor together with the fresh synthesis gas. Only by this recycle operation, it becomes possible to completely convert the synthesis gas. By doing this, however, it is unavoidable that the components methane and rare gases described above are enriched in the synthesis loop, since they are inert components with regard to the ammonia synthesis. With increased concentration, these components cause the reduction of the partial pressure of the reactants, which exerts an unfavorable effect on the state of the reaction equilibrium.

It is essential to continuously remove from the loop the same quantity of inert gases which enter the synthesis loop. If the ammonia product is removed from the synthesis loop by partial condensation after appropriate cooling, then depending on pressure and concentration, up to 50% of the inert gases are already bound in the liquid ammonia due to their solubility and hence are discharged with it. The remaining inert gases are removed by withdrawing a portion of the synthesis recycle gas, the so-called purge gas. The volume of the purge gas is generally up to 5% of the synthesis gas fed to the synthesis loop. Plants, in which separation of the ammonia product is effected by water scrubbing, must remove almost the entire amount of inert gases as the purge gas, because the solubilities of the gases are much lower in water than in liquid ammonia. In such a case, the volume of the purge gas may reach up to 10% of the synthesis gas fed to the synthesis loop. Control of the inert gas concentration in the synthesis recycle gas is of greatest importance for an economical operation of ammonia plants. To date, it has exclusively been accomplished by controlling the purge gas volume. An decrease of this volume increases the inert gas concentration, an increase in the volume decreases it. In the case of a normal constant ammonia production, the partial pressure of the reactants, nitrogen and hydrogen, must be kept constant, so that any change of the purge gas volume, which may necessitate the control of a downstream hydrogen recovery/rare gas unit, inevitably leads to a change of the synthesis pressure. Moreover, the disadvantage of this type of control is that the concentrations of the rare gases and methane can not be changed independently to each other and that the inert gas volume removed with the purge gas varies only to the extent that the portion of the dissolved inert gases changes depending on pressure and concentration. Removal of the inert gases from the synthesis loop in all cases is first of all associated with a considerable loss of hydrogen, nitrogen and ammonia.

The resulting purge gas is usually refrigerated first, in order to minimize the ammonia content. In the past, it was common to utilize this gas only energetically as fuel gas, e.g. in the primary reforming unit. In the meantime, however, the majority of ammonia plants are at least equipped with downstream units for the recovery of hydrogen. The principle of most of these plants is to cool the purge gas to be treated, after removal of the residual ammonia, e.g. by refrigeration, separation of the condensed ammonia and/or water scrubbing followed by gas drying, with external cold energy by utilizing a separate refrigeration loop or from its own cold energy by applying the Joule-Thomson effect (e.g. DD-PS 47,120), down to a temperature at which methane, rare gases and nitrogen are condensed but hydrogen is left gaseous. Both cases yield a hydrogen fraction containing mainly hydrogen, small quantities of nitrogen as well as methane and rare gases in the range of a few percent, and a residual gas fraction consisting of methane, rare gases and nitrogen as well as a small quantity of hydrogen which has partially been dissolved in the initial liquid mixture of methane, rare gases and nitrogen.

It is moreover possible to separate hydrogen by means of separation membranes (e.g. DE-OS 2,910,742). This yields a hydrogen-rich gas with a similar composition to that of the low temperature processes. The hydrogen losses however are higher than by the above-mentioned processes, i.e., a larger residual gas fraction is produced with a hydrogen content of up to 40 vol %.

The pressure of the hydrogen recovery unit is commonly selected in such a way that the obtained hydrogen fraction can be supplied to the suction side of the synthesis gas compressor. The residual gas produced in the aforementioned processes is often used only energetically as fuel gas, e.g. in the primary reforming unit of the ammonia plant. As the rare gas content of the gas is usually around 15 to 25 vol %, rare gas units are increasingly installed, which recover argon and, if necessary, also other rare gases in highly purified form by further low temperature separation, whereby the other gas components are also produced as relatively clean fractions. This is usually effected by utilizing a separate refrigeration loop. It is also possible to realize the aforementioned low temperature separation of the purge gas to recover hydrogen and the further treatment of the residual gas to mainly obtain argon in one complex.

As ammonia production is extremely investment-and energy-consuming, much development work has been made to upgrade numerous existing ammonia plants for the past years. In the case of an ammonia-hydrogen recovery-rare gas plant complex, the aims are: energy related improvement of the synthesis gas generation, energy related improvement of the ammonia synthesis, increase of ammonia production and increase of the efficiency of argon production.

In the case of the synthesis gas generation for instance, a possibility is given to distinctly reduce the energy consumption by lowering the steam/carbon ratio with simultaneous modification of the carbon dioxide removal system or also by careful operation of the primary reformer. These measures however are disadvantageous in that the inert ga content in the synthesis gas increases due to a higher methane concentration at the outlet of the secondary reformer and a higher carbon monoxide concentration at the outlet of the carbon monoxide conversion unit.

Energy-saving improvements of the ammonia synthesis are achieved by lowering the synthesis pressure by way of suitable modifications of the synthesis loop (DD-PS 225,029). If in this case, the separation of the formed ammonia from the synthesis recycle gas is effected by partial condensation, a greater volume of inert gases must be removed from the synthesis recycle gas as the purge gas, because the gas solubility in liquid ammonia is lowered with the reduced pressure.

Measures achieving a capacity increase of an ammonia plant also lead at least to an inevitable proportional increase of the inert gas supply to the synthesis loop, whereby in this case, besides the methane volume, the argon volume also increases due to the proportional increase of the process air. Separation of the ammonia product from the synthesis recycle gas is carried out almost exclusively by partial condensation.

Usually this operation is followed by stepwise depressurizing of the liquid ammonia from the synthesis pressure to the pressure of downstream consumers or down to almost atmospheric pressure. By this operation, the major portion of the dissolved synthesis recycle gas is released again and used simply as fuel gas, e.g. in the primary reforming unit. In order to avoid the loss of rare gases for the downstream hydrogen recovery/rare gas production unit in this manner, a process is known (CD-PS 235,385), according to which the dissolved rare gases are returned together with the synthesis gas to the synthesis loop by a tie-in of these gases into the synthesis gas generation section and thus are subjected to a downstream treatment as the purge gas. The disadvantage is that this process is, exactly like all other modification solutions described so far, only applicable to the extent that it is possible to treat the increased inert gas quantities in the downstream hydrogen recovery/rare gas unit and to compensate by the modernizing effects for the economic disadvantage of only partial material utilization of the purge gas. Because neither the downstream hydrogen recovery/rare gas unit has, as a rule, relevant capacity reserves, nor can a portion of the purge gas for material use be cast away, nor the recycle gas volume be kept at its permissible value due to insufficient reserves in the synthesis gas compressor and/or for reasons of cost by increasing the inert gas content in the synthesis recycle gas, it is necessary to create additional processing capacities, which results in considerable investment cost. The requirements are yet increased by the fact that all revamping measures entail an excessive methane content in the synthesis gas. This causes the rare gas content in the synthesis loop to be lowered and, accordingly, requires additional investment to increase the concentration in the recycle flash gas.

SUMMARY OF THE INVENTION

The aim of the invention is to remove the disadvantages described above in the control of ammonia-hydrogen recovery-rare gas plant complexes caused by the modification of the synthesis gas generation section and/or of the synthesis loop and/or by the increase of ammonia production of such complexes, without causing energy losses and/or production decreases in ammonia and rare gas generation or requiring additional investments.

DETAILED DESCRIPTION OF THE INVENTION AND PREFERRED EMBODIMENT

Figure 1:
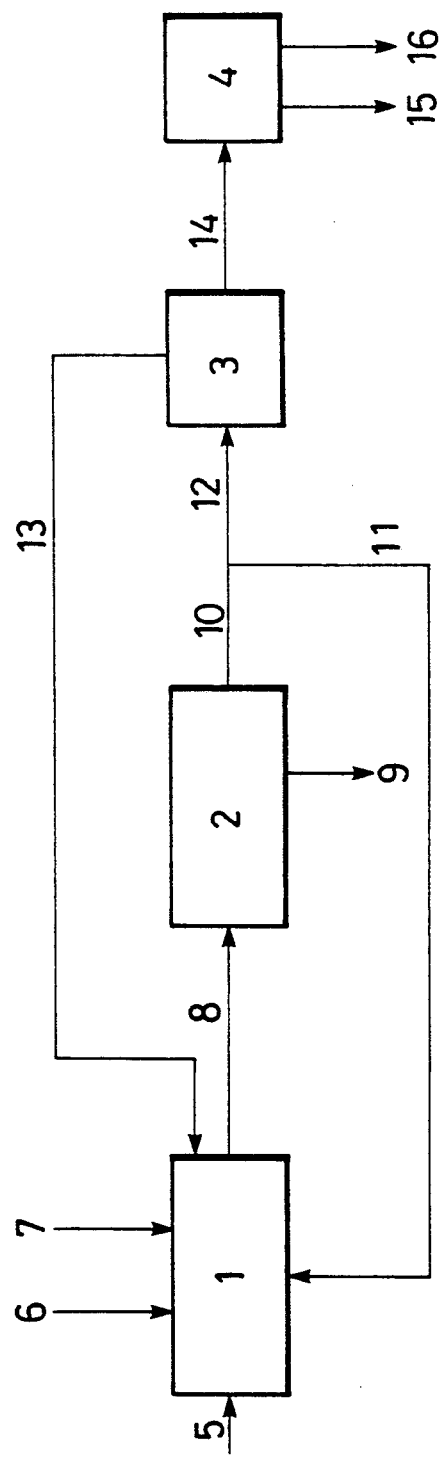
FIG. 1 illustrates an application example of the invention in an ammonia-hydrogen recovery-rare gas plant complex, in which:
1. Synthesis gas generation section
2. Ammonia synthesis loop
3. Hydrogen recovery unit
4. Rare gas unit
5. Natural gas
6. Process steam
7. Process air
8. Synthesis gas
9. Ammonia product
10. Purge gas
11. First partial stream of the purge gas
12. Second partial stream of the purge gas
13. Recovered hydrogen
14. Residual gas from the hydrogen recovery unit
15. Recovered argon
16. Recovered nitrogen

It is the task of the invention to propose a process for the separate control of the methane and rare gas contents in an ammonia-hydrogen recovery-rare gas plant complex, which permits the supplying to an hydrogen recovery/rare gas unit, situated downstream of a modernized ammonia plant, without any increase of capacity, a feed gas, the amount of which is not increased in spite of revamping of the ammonia plant, without the need for giving-up full material utilization of the purge gas for rare gas recovery (i.e. with full utilization of the gas) or without a resulting increase of the inert gas concentration in the synthesis loop.

The invention solves the task by removing a controlled volume of the purge gas from the synthesis loop—if necessary after additional refrigeration and separation of the condensed ammonia product or removal of the entrained ammonia in a water scrubbing unit—and dividing it into two controllable partial streams, of which one partial stream is fed to the downstream hydrogen recovery/rare gas unit and the other partial stream is recycled to the synthesis gas generation section, at least upstream of the secondary reforming section.

The methane in the partial stream recycled to the synthesis gas generation section is converted to carbon dioxide and hydrogen during the reforming and carbon monoxide conversion and thus removed from the synthesis loop without a load increase in the downstream hydrogen recovery/rare gas unit. By this partial stream, only hydrogen, nitrogen and the rare gases are therefore recycled to the synthesis loop. According t this technology, the methane content in the synthesis loop is decreased, while the argon content is increased, with the usual desired constant overall concentration of the inert gases.

The ratio of the partial stream recycled to the synthesis gas generation section to the stream fed to the hydrogen recovery/rare gas unit may generally rang from 1:0.2 to 1:10, preferably from 1:0.3 to 1:5, and more preferably from 1:0.5 to 1:3.3 so as to attain the purpose of the invention.

Application of the inventive process is therefore extremely advantageous and makes it possible to solve the following control tasks individually or in combination by changing the purge gas volume and/or dividing it into two partial streams:
   Control of the inert gas content in the synthesis loop
   Control of the methane concentration in the synthesis loop and thus in the raw gas to the hydrogen recovery/rare gas unit
   Control of the argon concentration in the synthesis loop and thus in the raw gas to the hydrogen recovery/rare gas unit
   Control of the raw gas volume to the hydrogen recovery/rare gas unit An outstanding feature of this process is that it is possible to prevent, by a controlled draw-off of a purge gas volume, its controlled split into two partial streams and recycling of one partial stream to the synthesis gas generation section, the disadvantageous effect on the downstream hydrogen recovery/rare gas unit of the increase in the methane and/or rare gas quantity which is caused by modernizing the ammonia plant and which must be removed from the synthesis loop. For that purpose, neither is it necessary to withhold a portion of the purge gas and/or the residual gas of the hydrogen unit from material utilization or does there occur an increase of the total inert gas concentration in the synthesis loop. Thus energy related disadvantages or costly expansions or modifications of the ammonia-hydrogen recovery-rare gas plant complex are avoided.

As the purge gas returned to the synthesis gas generation section according to the invention consists mainly of hydrogen, usually between 55 and 65 vol %, it is particularly advantageous to return it before the desulfurization unit and to use it there as the hydrogen supplier for the conversion of organically fixed sulfur in the natural gas to hydrogen sulfide. Thus it is possible to partly or completely shut down the synthesis gas recycling from an intermediate stage of the synthesis gas compressor.

EXAMPLE

FIG. 1 shows an application example of the invention in a complex comprising a modernized 1,360 t/d ammonia plant, a hydrogen recovery unit with a processing capacity of 5,000 Nm$^3$/h and a rare gas unit with a processing capacity of 1,900 Nm$^3$/h. Here the rare gas unit has the additional control task to discharge from time to time liquid nitrogen as a product besides processing the full argon quantity supplied from the ammonia plant.

Energy-saving improvements have been made in the synthesis gas generation section of the ammonia plant. Moreover, a decrease of the synthesis pressure from 30 MPa to 25 MPa has been achieved by the installation of an additional ammonia fresh gas reactor in the synthesis loop. In parallel, the capacity of the ammonia plant has been increased from 1,360 t/d to 1,600 t/d.

By virtue of these measures, the inert gas volumes and concentrations in the synthesis gas have changed as follows:

|  | before modification | | after modification | |
| --- | --- | --- | --- | --- |
|  | Nm$^3$/h | Vol % | Nm$^3$/h | vol % |
| Methane | 1,240 | 0.80 | 2,000 | 1.10 |
| Argon | 510 | 0.33 | 800 | 0.44 |

The control task can be formulated as follows:

| Ammonia production | 1,600 t/d |
| --- | --- |
| Argon production | 19 t/d |
| Liquid nitrogen production | 0 to 3 t/d |

Restrictions for this control task are set by the above-mentioned processing capacities of the hydrogen recovery/rare gas unit and the inert gas concentration in the synthesis recycle gas, which is to be kept constant at 21 vol %.

Natural gas, process steam and process air enter the synthesis gas generation section 1 through lines 5, 6 and 7. The desired synthesis gas is generated by the application of the steam reforming process, two-stage carbon monoxide conversion, chemical carbon dioxide scrubbing and methanation for the refining of the synthesis gas, which is supplied to the ammonia synthesis loop 2 through line 8. Here, 1,600 t/d ammonia are produced at a pressure of 25 MPa and discharged at 2 MPa via line 9 in liquid form after stepwise reduction in pressure. A certain volume of a purge gas is removed via line 10 after refrigeration in order to control the inert gas content in the synthesis recycle gas. In consideration of the control task, this purge gas is divided into two partial streams. The first partial stream is recycled via line 11 to the synthesis gas generation section 1 to control the methane content in the synthesis recycle gas. The second partial stream is fed to the hydrogen recovery unit 3 via line 12. It essentially determines the residual gas volume to the rare gas unit 4. The hydrogen recovered in the hydrogen recovery unit 3 is fed via line 13 to the suction side of the synthesis gas compressor, which is included here in the synthesis gas generation section. The residual gas is supplied through line 14 to the rare gas unit 4. The argon produced there is discharged through line 15. When liquid nitrogen is produced, it is discharged via line 16.

Numerical examples for the application of the invented process are given in the table below:

| 1. Control task: | 1,600 t/d ammonia |
| --- | --- |
|  | 19 t/d argon |
| 2. Control task: | 1,600 t/d ammonia |
|  | 19 t/d argon |
|  | 3 t/d liquid nitrogen |

|  | 1. control task | 2. control task |
| --- | --- | --- |
| Natural gas | 40,000 Nm$^3$/h | 40,000 Nm$^3$/h |
| Process air | 56,600 Nm$^3$/h | 56,600 Nm$^3$/h |
| Process steam | 92,000 kg/h | 92,000 kg/h |
| Synthesis gas | 189,000 Nm$^3$/h | 193,000 Nm$^3$/h |
| Ammonia product | 66,660 kg/h | 66,660 kg/h |
| Purge gas | 10,700 Nm$^3$/h | 13,500 Nm$^3$/h |
| in which: | 11 vol % Ar | 13 vol % Ar |
|  | 14 vol % CH$_4$ | 12 vol % CH$_4$ |
| 1. partial stream | 5,700 Nm$^3$/h | 9,400 Nm$^3$/h |
| 2. Partial stream | 5,000 Nm$^3$/h | 4,100 Nm$^3$/h |
| Raw gas (to rare gas unit) | 1,900 Nm$^3$/h | 1,600 Nm$^3$/h |
| Argon product | 800 kg/h | 800 kg/h |
| Liquid nitrogen | 0 kg/h | 125 kg/h |
| Partial stream ratio | 1:0.877 | 1:0.436 |

Without the application of the invented process, the ammonia production of 1,600 t/d with simultaneous full argon production of 19 t/d and occasional supply of liquid nitrogen could only be effected under the following unfavorable conditions:

a) Increase of the inert gas content in the synthesis gas from 21 vol % to 30 vol % and this increase of the pressure in the synthesis loop by 3 MPa and increase of the operation load of the synthesis gas compressor by 7% (if such reserves are available anyway), or b) Expansion of the capacities of the hydrogen recovery/rare gas unit to 7,700 Nm$^3$/h and 3,000 Nm$^3$/h, respectively.

What is claimed is:

1. In a process for preparing ammonia by steam reforming of a hydrocarbon, said process comprising a synthesis gas generation section in which carbon dioxide is removed from ammonia synthesis gas, an ammonia synthesis loop and a gas recovery unit selected from the group consisting of a hydrogen recovery unit, a rare gas recovery unit and a combination thereof, the improvement comprising: removing a purge gas stream from the ammonia synthesis loop; dividing the purge gas stream into first and second streams, introducing said first stream into said synthesis gas generation section and introducing said second stream into said gas recovery unit to thereby enable separate control of methane and rare gas content in said ammonia synthesis loop.

2. The process according to claim 1, wherein the ratio of the first stream to the second stream lies between 1:0.2 and 1:10.

3. The process according to claim 1, wherein first stream is returned to the synthesis gas generation section upstream of a desulfurization unit.

4. The process according to claim 1, wherein the first stream returned to the synthesis gas generation section upstream of a primary reforming unit.

5. The process according to claim 1, wherein the first stream is returned to the synthesis gas generation section upstream of a secondary reforming unit.

6. The process according to claim 1, wherein ammonia is removed from said purge gas stream prior to said purge gas stream being divided into said first and second streams.

7. The process according to claim 1, wherein said hydro-carbon is natural gas.

8. The process according to claim 1, wherein said first stream comprises between 55 to 65 vol. % hydrogen.

* * * * *

UNITED STATES PATENT AND TRADEMARK OFFICE
CERTIFICATE OF CORRECTION

PATENT NO. : 5 069 891
DATED : December 3, 1991
INVENTOR(S) : Horst BENDIX et al It is certified that error appears in the above-identified patent and that said Letters Patent is hereby corrected as shown below:

Column 10, line 2; change "stream returned" to
---stream is returned---.

Signed and Sealed this

Fourth Day of May, 1993

Attest:

MICHAEL K. KIRK

Attesting Officer

Acting Commissioner of Patents and Trademarks